United States Patent [19]
Veil

[11] Patent Number: 6,138,239
[45] Date of Patent: Oct. 24, 2000

[54] METHOD AND SYSTEM FOR AUTHENTICATING AND UTILIZING SECURE RESOURCES IN A COMPUTER SYSTEM

[75] Inventor: Leonard Scott Veil, Campbell, Calif.

[73] Assignee: N★Able Technologies, Inc., Cupertino, Calif.

[21] Appl. No.: 09/192,152

[22] Filed: Nov. 13, 1998

[51] Int. Cl.[7] .................................................... G06F 12/14
[52] U.S. Cl. ............................................. 713/200; 713/156
[58] Field of Search .................................... 713/200, 173, 713/175, 201, 156, 202, 171; 709/229; 380/4, 228, 25, 259, 159; 340/825.34

[56] References Cited

U.S. PATENT DOCUMENTS

| | | | |
|---|---|---|---|
| 4,797,928 | 1/1989 | Dykes | 380/49 |
| 5,406,624 | 4/1995 | Tulpan | 380/4 |
| 5,596,718 | 1/1997 | Boebert et al. | 395/187.01 |
| 5,745,574 | 4/1998 | Muftic | 380/23 |

*Primary Examiner*—Robert W. Beausoliel, Jr.
*Assistant Examiner*—Pierre Eddy Elisca
*Attorney, Agent, or Firm*—Sawyer Law Group LLP

[57] ABSTRACT

A system and method for executing secure transactions on a computer system is disclosed. The computer system includes a memory. In one aspect, the method and system include providing a basic input output system (BIOS) on the computer system, providing a secure peripheral coupled with the computer system, and providing a master security co-processor coupled with the computer system. The BIOS includes first unit for indicating a first trust relationship with the BIOS. The secure peripheral includes second unit for indicating a second trust relationship with the secure peripheral. The master security co-processor is for processing sensitive data on the computer system and includes third unit for indicating a third trust relationship with the master security co-processor. The method and system further includes utilizing the BIOS to verify at least one of the first trust relationship, the second trust relationship, or the third trust relationship using the first unit for indicating the first trust relationship, the second unit for indicating the second trust relationship, or the third unit for indicating the third trust relationship. In another aspect, the method and system are for executing an application utilizing sensitive data on a computer system. The computer system includes a master security co-processor and a secure peripheral. In this aspect, the method and system include establishing a secure channel for communication between the master security co-processor and the secure peripheral for executing a portion of the application and executing the portion of the application by the master security co-processor utilizing the secure channel.

34 Claims, 11 Drawing Sheets

6,138,239

METHOD AND SYSTEM FOR AUTHENTICATING AND UTILIZING SECURE RESOURCES IN A COMPUTER SYSTEM

CROSS-REFERENCE TO RELATED APPLICATIONS

The present application is related to co-pending U.S. patent application Ser. No. 09/084,078 entitled "METHOD AND SYSTEM FOR SECURE TRANSACTIONS IN A COMPUTER SYSTEM," filed on May 22, 1998, and assigned to the assignee of the present invention. Applicant hereby incorporates by reference the above-mentioned co-pending application.

FIELD OF THE INVENTION

The present invention relates to secure transactions performed using a computer system and more particularly to a method and system for authenticating and utilizing secure resources in a computer system to perform these secure transactions.

BACKGROUND OF THE INVENTION

Computers and computer networks are increasingly used for conducting electronic commerce and other types of transactions. Applications which allow individual users to engage in these transactions also continue to emerge. In order to facilitate these transactions, the integrity and validity of these transactions and the security of applications used to perform these transactions must be maintained. However, conventional computer environments allow hackers to compromise the integrity and validity of such transactions. Consequently, there continues to be a need to provide security for users wising to engage in electronic commerce and other transactions.

Conventional computer networks, such as a local area network, a wide area network and/or a public network (e.g. the Internet), link personal computers and workstations to one or more servers and to each other. This environment permits computer users to interact with the servers or with each other. Transactions between computer users or between computer users and servers are processed using applications that are executed on conventional operating system platforms such as OS/2, Windows, and UNIX. Typically, these transactions include confidential or sensitive data such as bank, credit and debit account information, and may involve significant sums of money. These conventional operating system platforms are typically recognized as insecure.

Thus, conventional computer systems have significant security holes. Secure execution in these conventional computer environments is extremely difficult to provide. For example, recent security breaches in computer systems have occurred through holes in browser applications used to access a network such as the Internet. Using push technology that automatically delivers information, such as ActiveX or Javascript programs, to a computer, unscrupulous individuals may gain access to the computer system and sensitive user data. Other security breaches have occurred using attacks which decode files containing cryptographic keys. As a result, an attacker can compromise all future communications or masquerade as the user or sensitive information holder.

Therefore, sensitive data passing through or stored in the computers can be compromised by hackers or intruders that can gain access to the computer or the computer network to which the computer is connected. Moreover, even if the sensitive data were to be encrypted, other sensitive data inside the computers may be susceptible to attack when, for example, the computer systems download and execute rogue programs.

There are emerging mechanisms to address potential attacks on computer systems. One of these is the creation of trusted execution environments in a conventional computer system. These trusted environments possess hidden execution and protected storage. Hidden execution allows for the execution of operations which are not observable to traditional computing resources. Protected storage provides for the safekeeping of sensitive information, such as cryptographic keys, signature keys, or other private information. Hidden execution and protected storage allow conventional computer systems to execute portions of transactional protocols without allowing software debuggers to monitor the data structures and effect breakpoint or watchpoints within the trusted environment. These aspects of the trusted environment also aid in preventing viruses or other attack mechanisms from modifying the application data or executable object code. Thus, sensitive portions of the transactions may be protected from some traditional software attacks.

Although trusted environments provide some protection from traditional attacks, these trusted environments have several drawbacks. In particular, there is no mechanism for verifying the integrity of the trusted environment's security. A user may wish to provide input including sensitive data from a variety of sources, including smart cards, biometric sensors, or other peripheral devices. It is difficult to allow a user to input data to the trusted environment in a secure manner. It is also difficult to securely provide feedback relating to the processing occurring in the trusted environment.

Accordingly, what is needed is a system and method for providing an environment which allows secure transactions to be processed while avoiding many of drawbacks of the present implementations of trusted environments. The present invention addresses such a need.

SUMMARY OF THE INVENTION

The present invention provides a system and method for executing secure transactions. The computer system includes a memory. In one aspect, the method and system comprise providing a basic input output system (BIOS) on the computer system, providing a secure peripheral coupled with the computer system, and providing a master security co-processor coupled with the computer system. The BIOS includes first means for indicating a first trust relationship with the BIOS. The secure peripheral includes second means for indicating a second trust relationship with the secure peripheral. The master security co-processor is for processing sensitive data on the computer system and includes third means for indicating a third trust relationship with the master security co-processor. The method and system further comprise utilizing the master security co-processor or the BIOS to verify at least one of the first, second, or third trust relationships using the first means for indicating the first trust relationship, second means for indicating the second trust relationship, or third means for indicating the third trust relationship. In another aspect, the method and system are for executing an application utilizing sensitive data on a computer system. The computer system includes a master security co-processor and a secure peripheral. In this aspect, the method and system comprise establishing a secure channel for communication between the master security co-processor and the secure peripheral for executing a portion of the application, executing the portion of application by the master security co-processor and utilizing the secure channel.

According to the system and method disclosed herein, the present invention provides a trusted environment which can be authenticated in a computer system. The rapid execution of secured transactions without compromising sensitive data is thereby facilitated. In addition, the secure resources in the system can be queried to determine the ability of the system to execute the secured transactions. The use of secure resources can also be tracked.

DETAILED DESCRIPTION OF THE INVENTION

The present invention relates to an improvement in performing secure transactions in a computer system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
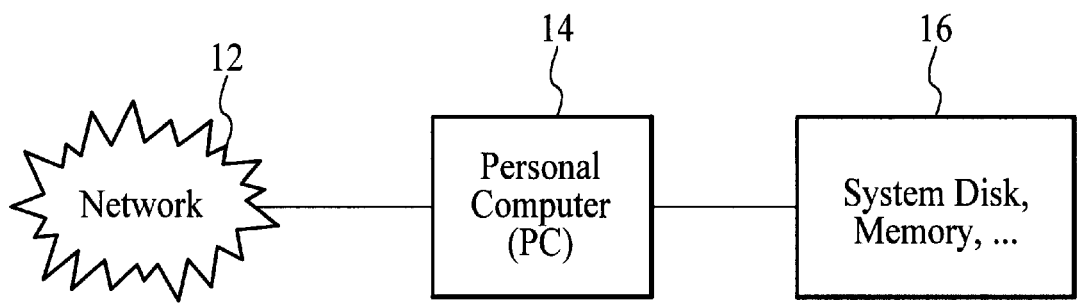
FIG. 1 is a block diagram of a conventional prior art system for performing electronic transactions.

FIG. 1 is a block diagram of a conventional system 10 for performing electronic transactions. The system 10 includes a personal computer or workstation (computer) 14 which is equipped with a computer disk and memory (disk) 16. The computer 14 is linked to other computers (not shown) through the network 12. The network 12 can be a local area network linking computers in one building, a wide area network linking computers of one organization located in separate buildings, a public network such as the Internet.

A majority of the application programs for conducting electronic transactions (electronic transactions applications) are executable on one of the conventional operating system platforms such as OS/2, Windows, and UNIX. Conventional operating system platforms do not provide a secure environment for executing the electronic transactions applications. In such an environment, confidential information which may be related to the electronic transactions (sensitive data) can be easily compromised. Breaching the security conventional computers 14 can include the decoding of files containing cryptographic keys, possibly unlocking access to other systems or other mechanisms for attacking the computer system.

Accordingly, the need for preserving the integrity and protecting the validity of electronic transactions gave rise to alternative systems and methods. These systems and methods provide a more secure environment for conducting electronic transactions.

It is known that transaction information can be authenticated within a computer system. Electronic transaction applications are typically associated with well-known public-key cryptography algorithms which utilize a key-pair of a public key and a private-key for authentication. The public-key is data available in the public domain. The private-key is sensitive data personal to its owner. Private-keys are provided to individuals on smart cards issued to them by organizations such as banks, credit companies, employers, etc.

Figures 2A, 2B:
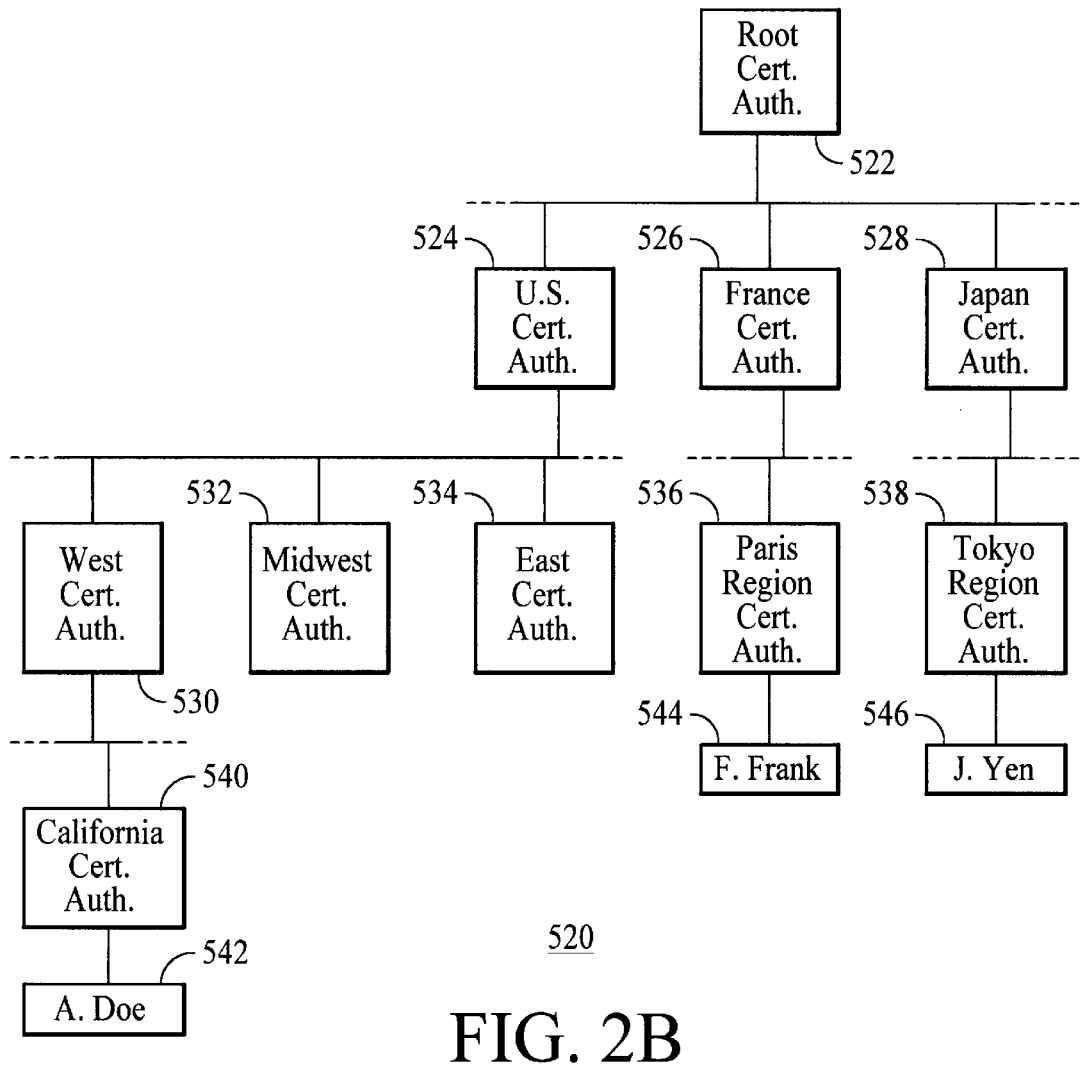
FIG. 2A is a diagram of a conventional prior art certificate structure.
FIG. 2B is a diagram of a conventional certificate chain for authenticating electronic transactions.

A digital certificate binds the key-pair to a name thus providing a digital identity. The digital certificate is used to verify that the public-key belongs to the particular entity using it. FIG. 2A is a diagram of a conventional certificate structure. A conventional certificate structure conforms, for example, with the X509.v3 standard certificate structure. A conventional digital certificate 500 includes a user name 502, a certificate validity date 504, and the public-key 508. The certificate is "signed" by a mutually trusted authority (i.e., trusted by the public-key user and his transacting party). The mutually trusted authority, commonly known as the certificate authority or issuing authority 506, authenticates the public-key user identity by providing a signature 510, verifying that the public-key really belongs to the public-key user.

With public-key cryptography, a message, encrypted or unencrypted, can be "signed" with the private-key and transmitted to an addressee. Then, the addressee, or anyone having the public-key, can use the public-key to decipher the message and know who sent it. Digital certificates allow authenticating messages by tracing the messages to their source and a common point of trust, usually referred to as a "root" entity. Typically, a certificate chain is used for this purpose.

FIG. 2B is a diagram of a certificate chain for authenticating electronic transactions. A certificate chain having a root certification authority 522 allows individuals in different countries and regions to electronically transact with each other. The root certification authority 522 allows certification authorities in various countries, and regions within those countries, to issue digital identities to individuals. The certificate chain creates a trust relationship where trust flows upwards from each transaction party to the root certification authority 522.

What is meant by "trust relationship" is that there exists a significant relationship between two devices or entities. It is based on several principles: (1) authentication (it should be possible for the receiver of a message to ascertain its origin; an intruder should not be able to masquerade as someone else); (2) integrity (it should be possible for the receiver of a message to verify that it has not been modified in transit; an intruder should not be able to substitute a false message for a legitimate one); and (3) nonrepudiation (a sender should not be able to falsely deny later that he sent a message). Once given a trust relationship, it is possible to establish a "secure" channel where the channel can optionally be used to provide data confidentially.

Accordingly, for example, there may be a Japanese certification authority 528, a French certification authority 526, and a U.S. certification authority, each issuing digital identities to Japanese, French and U.S. residents, respectively. In Japan, a Tokyo region certification authority 538 may issue a digital identity 546 to J. Yen. In France, a Paris region certification authority 536 may issue a digital identity 544 to F. Frank. In the U.S., there may be an East certification authority 534, a Mid-west certification authority 532 and a West certification authority 530. The West certification authority 530 may issue a digital identity to a California certification authority 540 which, in turn, may issue a digital identity 542 to A. Doe.

When A. Doe, a California resident, wants to conduct electronic transactions by exchanging messages with J. Yen in Japan and/or with F. Frank in France, A. Doe needs to be sure that the electronic transactions are conducted with J. Yen and/or F. Frank and not with imposters. Through existing certificate technology, it is possible to verify the digital identity of a sender of transaction messages by traversing upwards through the certificate chain. In checking the digital certificate in someone's message, A. Doe can check if there is a valid digital identity in the person's digital certificate. That is, A. Doe can check if in J. Yen's message there are valid certification authority signatures of the Tokyo region certification authority 538, the Japan certification authority 528, and the root certification authority 522.

Public-private-key cryptography is characterized in that it is an asymmetric cryptography wherein if transformation (encryption) is done with the user's public-key, only the user's private-key will do the reverse transformation (decryption). That is, only one of the keys is needed on each side, one for the transformation and the other for the reverse transformation, respectively.

In contrast, symmetric key cryptography uses one key, which both sides use to encrypt and decrypt their messages. One side encrypts a message using the key, and the other side uses the same key to decrypt the message. This key must be kept secret; if an unauthorized person obtains the key, he can read all the communications encrypted with that key. Thus, key distribution is a critical concern—there are no public keys which can be freely distributed, all keys must be kept secret and a highly secure distribution scheme must be devised to preserve the security of the system. Private-public-key systems allow parties who haven't previously met to communicate securely. Since the public keys can be widely distributed, anyone can get a copy of the public key for a person with whom they wish to communicate securely and encrypt a message to them in their public key while authenticating that user via his/her digital certificate.

Referring back to FIG. 1, in order to allow secure transactions to be performed on the computer 14, a trusted environment may be provided on the computer 14. A trusted environment on the computer 14 possesses hidden execution, which allows operations to execute in a manner not observable to traditional computing resources, and protected storage, which provides for the safekeeping of sensitive information. Hidden execution and protected storage aid in preventing viruses or other attack mechanisms from modifying the application data or executable object code.

Although trusted environments provide some protection from traditional attacks, one of ordinary skill in the art will realize that trusted environments have several drawbacks. There is no mechanism for verifying the integrity of the trusted environment's security. A user may wish to provide input including sensitive data from a variety of sources, including smart cards, biometric sensors, or other peripheral devices. It is difficult to allow a user to input data to the trusted environment in a secure manner. It is also difficult to securely provide feedback relating to the processing occurring in the trusted environment.

Co-pending U.S. patent application Ser. No. 09/084,078 entitled "METHOD AND SYSTEM FOR SECURE TRANSACTIONS IN A COMPUTER SYSTEM" filed on , and incorporated by reference above describes a method and system including a security co-processor. The method and system described in the above-mentioned co-pending application include a security co-processor and an interface for interfacing the security co-processor to a host computer system. In the method and system the secure transaction processing is performed locally in the security co-processor and non-secure transaction processing is performed in the host computer system. The method and system further include means for providing trusted input coupled to the security co-processor. In addition, the method and system include a second interface coupled to the security co-processor for receiving sensitive data from a smart card, and a trusted display coupled to the security co-processor for providing true transaction information.

Figure 3:
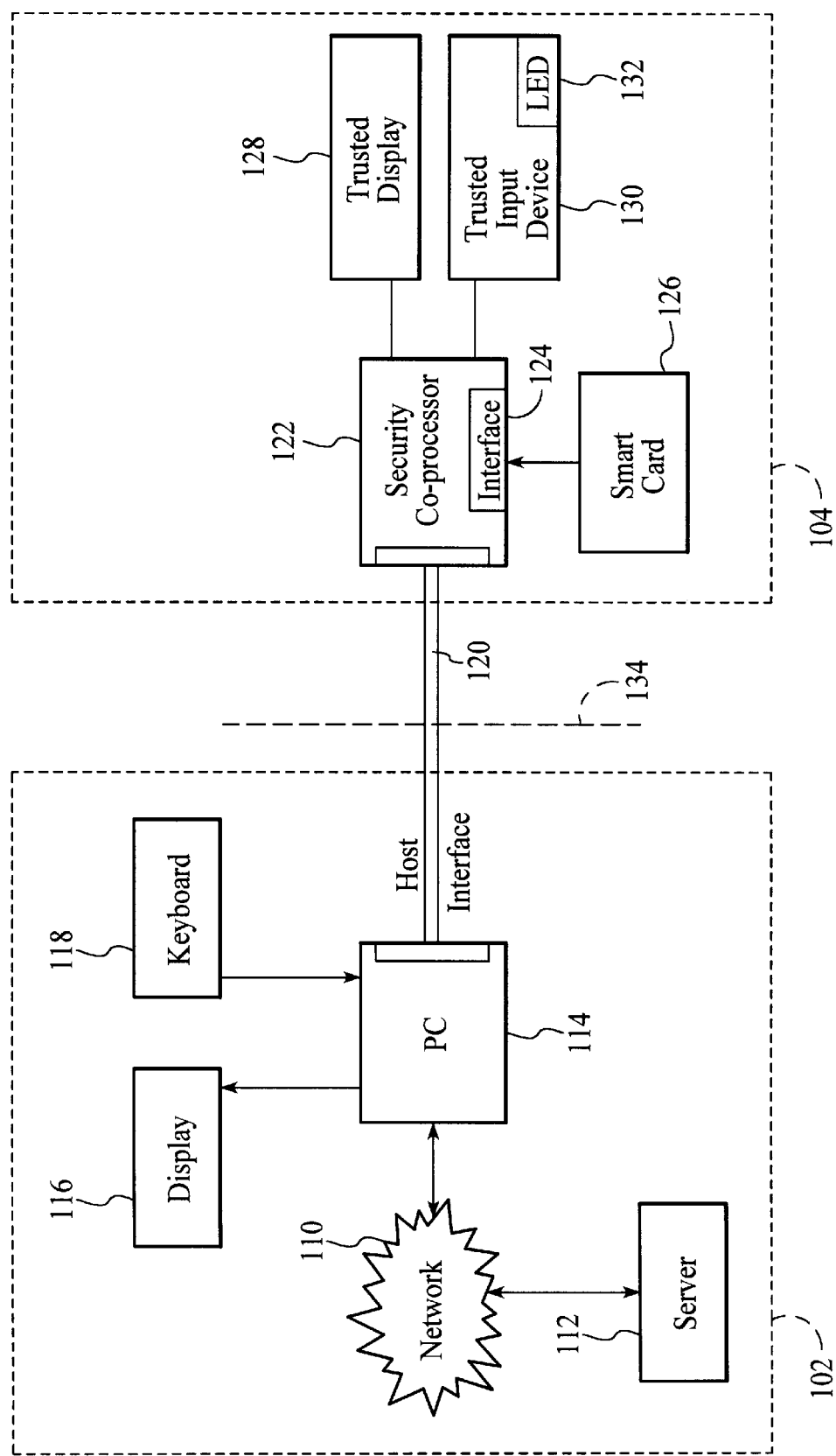
FIG. 3 is a block diagram of a system including a security co-processor in accordance with the present invention.

FIG. 3 is a block diagram of a system 100 including a security co-processor 122 in accordance with the above-mentioned co-pending application. The security co-processor 122 includes a host interface 120 for interfacing with a host computer (computer) 114 which is, in turn, connected to a network 110. The host interface 120 includes an interface 134 which is described in more detail in the co-pending application. Using the host interface 120, the security co-processor creates a firewall between the host computer 114 and the security co-processor 122.

The security co-processor 122 is depicted as interfacing with a trusted display 128 and a trusted input 130. The security co-processor 122 is further depicting as including a smart card interface 124. The security co-processor 122 interfaces with smarts cards 126 which are portable security devices for holding the sensitive data. The security co-processor 122 is preferably compatible with smart cards 126 conforming to the ISO7816 standard for smart card communications.

As described in the co-pending application, the secure computing environment 104 is separated from the traditional computing environment 102 by the interface 134. This enables the distributed processing of the electronic transactions. The distributed processing is characterized in that the security co-processor 122 is responsible for retrieving and processing sensitive data locally. In the secure computing environment 104 provided by the security co-processor 122, the sensitive data is encrypted and/or wrapped in cryptographically signed messages. The encrypted sensitive data and/or cryptographically signed messages are then passed to the traditional computing environment 102 of the computer 114 for completion of the electronic transactions processing. The computer 114 sends transaction information containing the cryptographically signed message to another computer linked to it through the network 110. Thus, in the system in accordance with the description of the above-mentioned co-pending application, the sensitive data is never processed by the computer 114 in the traditional computing environment 102 and it is therefore not susceptible to attack.

Although depicted as being coupled with a smart card 126, the security co-processor can be used in keyboards (not shown) or other peripheral devices. As a result, a secure computing environment, such as the secure computing environment 104, can be provided in other peripheral devices. In the context of this application, peripheral devices which can provide a secure computing environment through the use of a security co-processor 122 or other mechanism are called secure peripheral devices.

Although the security co-processor 122 functions for its intended purpose, one of ordinary skill in the art will readily recognize that the bandwidth available to security co-processor 122 and other secure peripherals may be significantly less than some applications require. For example, certain applications requiring real-time video stream decryption and deduction from a user's stored-value account. The security co-processor 122 may not be capable of providing such services. Consequently, such applications would benefit from a security co-processor which has a high bandwidth and direct access to system resources. In the context of the present application, such a security co-processor is called a master security co-processor. It is also desirable to provide verification of the security of the environment in which the master security processor is used. In addition, it is desirable to provide an environment in which the master security processor can utilize secure peripherals when processing an application.

The present invention provides a system and method for executing secure transactions. In one aspect, the method and system comprise providing a basic input output system (BIOS) on the computer system, providing a secure peripheral coupled with the computer system, and providing a master security co-processor coupled with the computer system. The BIOS includes first means for indicating a first trust relationship with the BIOS. The secure peripheral includes second means for indicating a second trust relationship with the secure peripheral. The master security co-processor is for processing sensitive data on the computer system and includes third means for indicating a third trust relationship with the master security co-processor.

The method and system further comprise utilizing the BIOS to verify at least on of the first trust relationship, the second trust relationship, or the third trust relationship using the first means for indicating the first trust relationship, the second means for indicating the second trust relationship, or the third means for indicating the third trust relationship.

In another aspect, the method and system are for executing an application utilizing sensitive data on a computer system. The computer system includes a master security co-processor and a secure peripheral. In this aspect, the method and system comprise establishing a secure channel for communication between the master security co-processor and the secure peripheral for executing the application, executing the application on the master security co-processor, and utilizing the secure channel for communication between the secure peripheral and the master security co-processor when executing the application.

The present invention will be described in terms of a particular system having a certain number of secure peripherals. However, one of ordinary skill in the art will readily recognize that this method and system will operate effectively for other systems using other secure peripherals. Moreover, the present invention will be described in the context of secure peripherals having security provided by a security co-processor. However, nothing prevents the present invention from being used with secure peripherals which are made secure using another mechanism. Finally, the present invention is described in the context of providing a master security co-processor in each system. However, the present invention is consistent with the use of multiple master security co-processors in each system.

Figure 4:
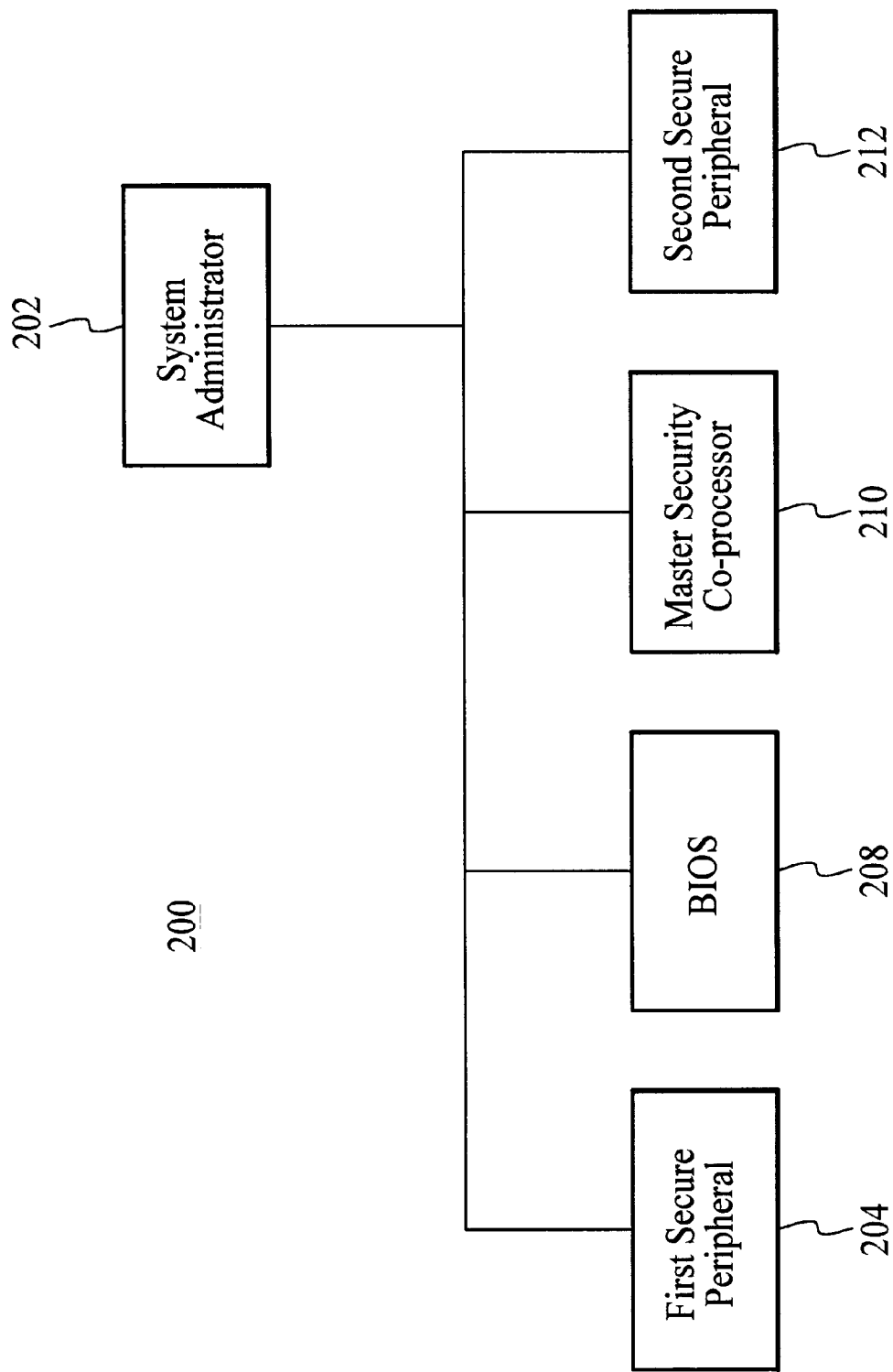
FIG. 4 is a diagram of one embodiment of a system capable of authenticating and using secure resources in a computer system.
Figure 5:
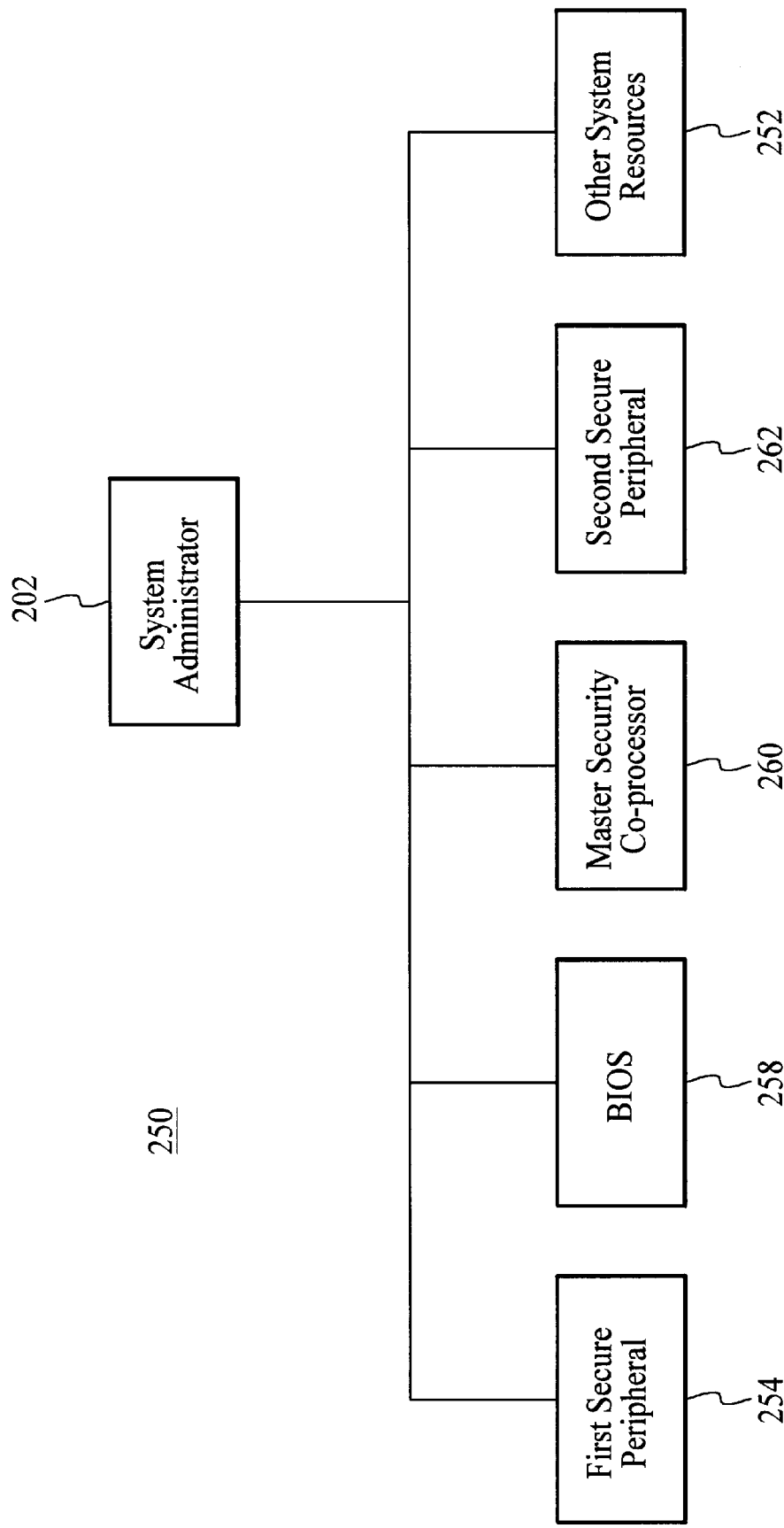
FIG. 5 is a diagram of another embodiment of a system capable of authenticating and using secure resources in a computer system.

To more particularly illustrate the method and system in accordance with the present invention, refer now to FIGS. 4 and 5 depicting block diagrams of two embodiments of such a system. Referring to FIG. 4, a computer system 200, which may be a portion of a network. The computer system 200 is managed by a system administrator 202, and includes a first secure peripheral 204, a second secure peripheral 212, a memory 206, and a master security co-processor 210. The system administrator 202 may include a computer or workstation from which an administrator can monitor the system 200.

The system administrator 202 is capable of managing a system because each device has a digital certificate (identity) which can be tracked. When a system administrator 202 wants to add a new hardware component (for example, a secure keyboard), he/she would run an installation program which generates a digital certificate for the secure keyboard which is signed by the administrator, and which installs that certificate in the keyboard and also makes an entry in the BIOS 208 indicating that this new resource is present in the computer system. Additionally, the installation program would update this remote database indicating that System XYZ now has secure keyboard ABC in it. Now, if secure keyboard ABC was detected on System JKL at a later date, he would know that a user has moved that keyboard. Equivalently, when System XYZ booted the next time, it would determine that keyboard ABC was no longer present and could send an "asset management" message to the system administrator 202.

The system 200 may also include other computers (not shown). The first secure peripheral 204 and the second secure peripheral 212 may include a secure keyboard, a secure reader, a secure display, a smart card, secure holder of biometric data, or other secure peripherals. The computer system 200 includes a basic input output system (BIOS) 208 in accordance with the present invention. The master security co-processor 210 is used in processing an application (not shown) which is used in performing secured transactions, such as an electronic commerce or other application. The master security co-processor preferably has direct high-bandwidth access to the resources of the system 200.

Similarly, FIG. 5 depicts a computer system 250 including additional system resources 252, a first secure peripheral 254, a second secure peripheral 262, a memory 256, and a master security co-processor 260. The system administrator 252 may include a computer or workstation from which an administrator can monitor the system 250. The system 250 may also include other computers (not shown). The first secure peripheral 254 and the second secure peripheral 262 may include a secure keyboard, a secure reader, a secure display, a smart card, secure holder of biometric data, or other secure peripherals. The computer system 250 includes a basic input output system (BIOS) 258 in accordance with the present invention. The master security co-processor 260 is used in processing an application (not shown) which is used in performing secured transactions, such as an electronic commerce or other application. The master security co-processor preferably has direct high-bandwidth access to the resources of the system 250.

The BIOS 208 or 258 is used in testing and preparing the system 200 or 250, respectively, for use. The BIOS 208 or 258 includes a mechanism for verifying the integrity of the security of various portions of the system 200 or 258, respectively. In a preferred embodiment, the BIOS 208 or 258 includes a digital certificate (not shown) and private key (not shown) which indicate a trust relationship between the BIOS 208 or 258 and the system administrator 202 or the remainder of the system 250, respectively.

Figure 6A:
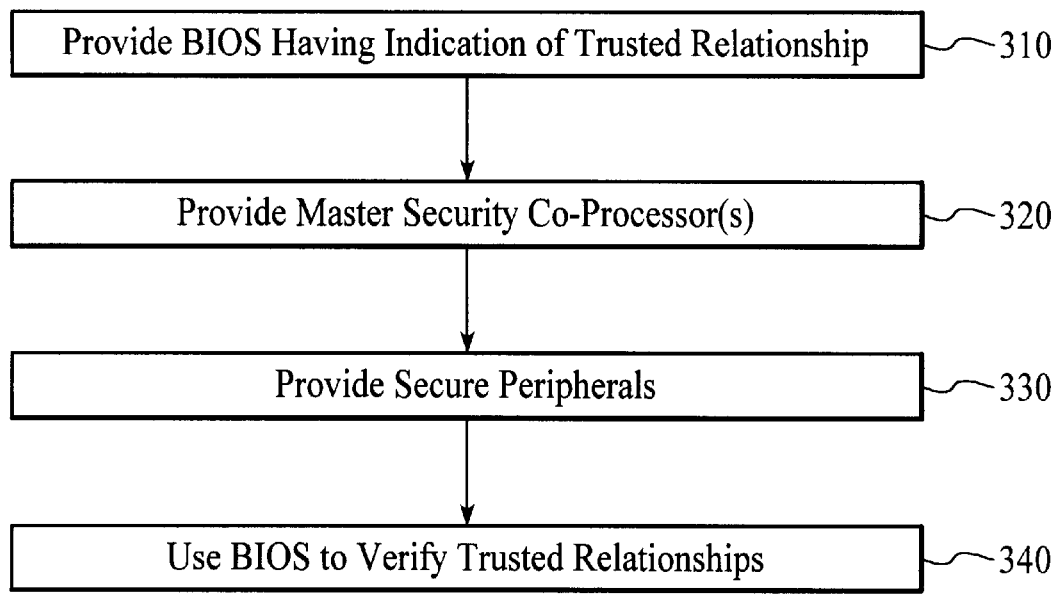
FIG. 6A is a flow chart depicting a method for authenticating secure resources in accordance with the present invention.

FIG. 6A depicts a method for providing the system 200 or 250 in which secured transactions can be executed and the security of the system and secure peripherals 204 and 212 or 254 and 262, respectively, can be verified. Via step 302, the BIOS 208 or 258 is installed in the system 200 or 250, respectively. As discussed above, the BIOS 208 OR 258 includes a digital certificate and private key, or other indication of a trust relationship between the BIOS 208 or 258 and the system administrator 202 or the system 200 or 250, respectively.

At least one master security co-processor 210 or 260 is installed, via step 320. The master security co-processor(s) 210 or 260 is to be used in processing applications which are used in performing secured transactions. The master security co-processor(s) 210 or 260 include an indication of a trust relationship between the master security co-processor(s) 210 or 260 and the system administrator 202 or the system 200 or 250, respectively. In a preferred embodiment, this indication is a digital certification and private key. The secure peripherals 204 and 212 or 254 and 262, respectively, are then installed, via step 330. As discussed previously, the secure peripherals 204, 212, 254, and 262 preferably include a security co-processor 122. Each of the secure peripherals 204, 212, 254, and 262 also include an indication of a trust relationship between each of the secure peripherals 204, 212, 254, and 262 and the system administrator 202 or respective system 200 or 250. In a preferred embodiment, each of the secure peripherals 204, 212, 254, and 262 includes a digital certificate and a private key. The BIOS 208 or 258 is then used to verify the trust relationships, via step 340.

Figure 6B:
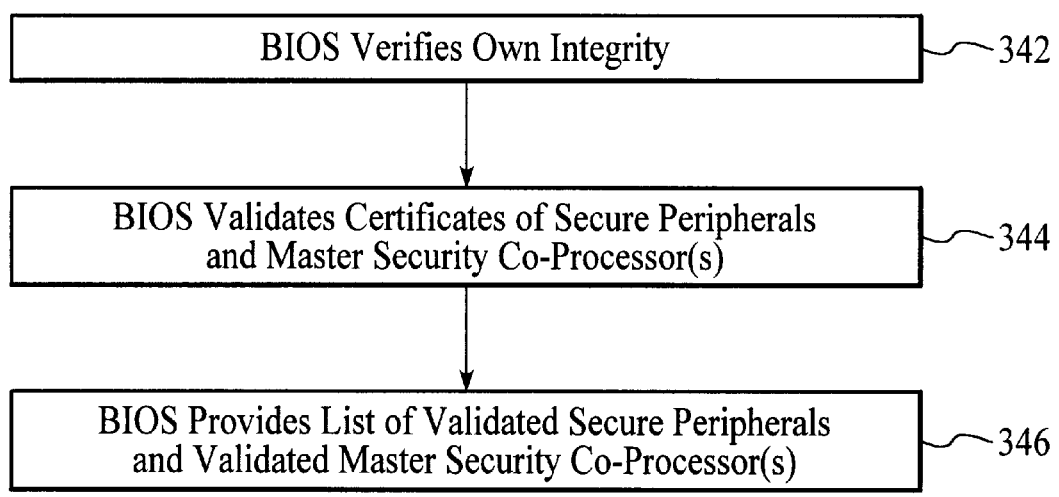
FIG. 6B is a flow chart of a method for verifying secure resources in accordance with the present invention.

FIG. 6B depicts a more detailed flow chart of a preferred embodiment of the step 340 of verifying trust relationships. The method 340 preferably occurs at least upon start-up. The method 340 could also be performed at particular intervals or other times when the configuration of the system 200 or 250 is updated to take into account other secure peripherals (not shown) or other master security co-processors (not shown) which have been added to the system 200 or 250. BIOS 208 or 258 verifies the integrity of its own security, via step 342. In a preferred embodiment, step 342 is performed using cryptographic hash and signature mechanisms. A hash is a one-way, collision free cryptography algorithm akin to a compression algorithm. Collision free means that for any single input there is a unique corresponding hash output. That is, if two segments of data are identical except for one bit, two entirely different hash outputs would result. One-way means that there is no feasible way to derive any of the input data from the hash value. Secure hash makes it very difficult to electronically forge signatures because is requires experimentation with a very large number of inputs only one of which may produce the particular hash output.

The BIOS 208 or 258 then validates the integrity of the secured peripherals 204 and 212 or 254 and 262, respectively, and master security co-processors 210 and 260, respectively, via step 344. In a preferred embodiment, step 344 includes validating the digital certificates of the secured peripherals 204 and 212 or 254 and 262 and validating the digital certificates of the master security co-processors 210 and 260. In a preferred embodiment, step 344 also includes determining whether new secured peripherals (not shown) or new master security co-processors (not shown) have been added to the system and validating any new secured peripherals or new master security co-processors. Via step 346, the BIOS provides a list of secure resources. Secure resources are those secured peripherals 204, 212, 254, or 262 and those master security co-processors 210 or 260 which have been determined as valid in step 344. In a preferred embodiment, step 346 is performed by providing a database of all secure peripherals 204 and 212 or 254 and 262 and all master security co-processors 210 or 260 which have been validated.

Thus, the secure peripherals 204, 212, 254, or 262 may allow a user to input sensitive data in a secure manner. Using the method 300, the integrity of each of the secure peripherals 204, 212, 254 and 262 as well as the integrity of the master security co-processors 210 and 260, respectively, can be verified. Once the systems 200 or 250 have been provided and the trust relationships validated using the method 340, applications which may be used in performing secured transactions can be run using the secure resources 204, 210, and 212 or 254, 260, and 262. Thus, a trusted environment for running applications is provided.

Figure 7A:
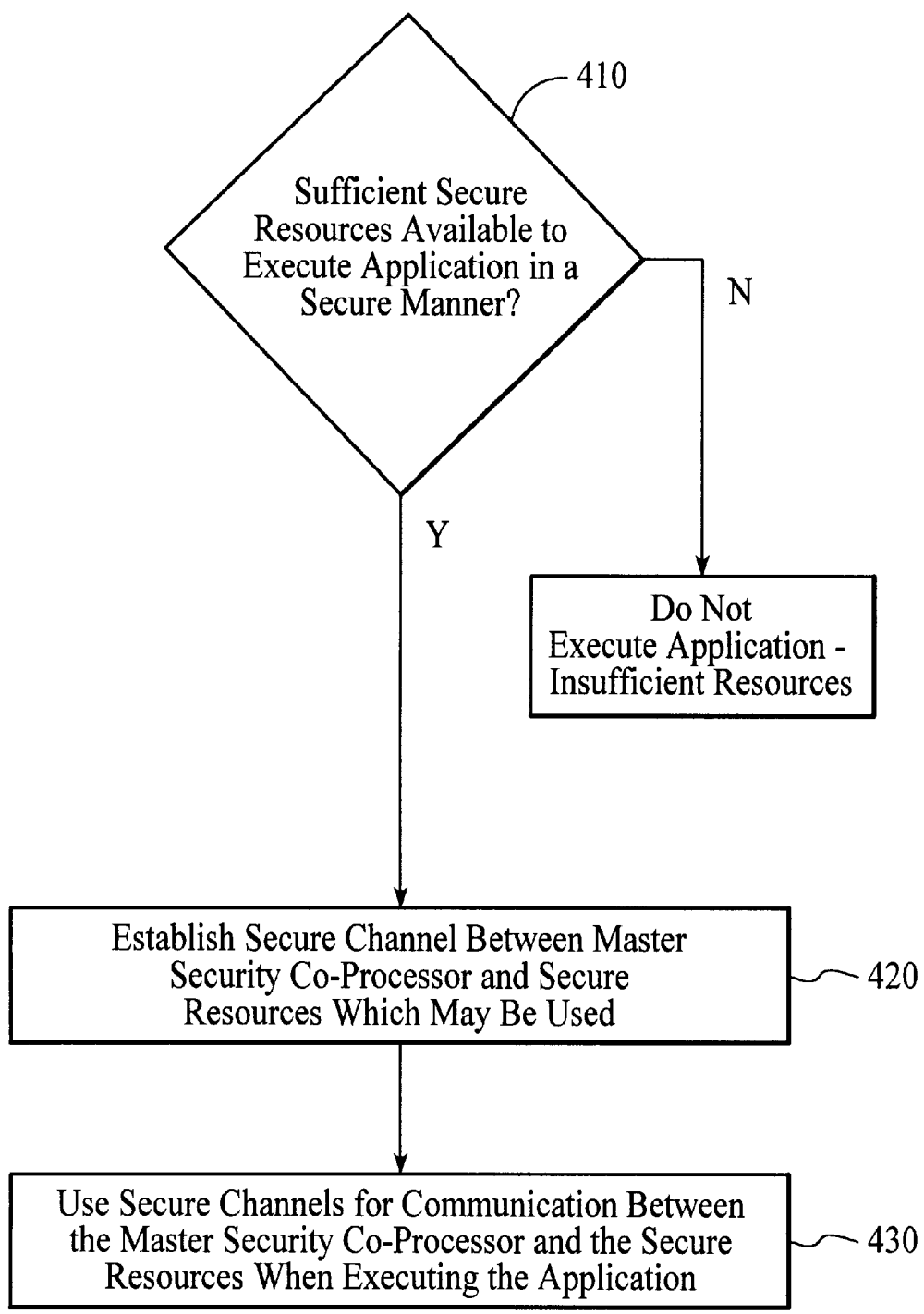
FIG. 7A is a flow chart of a method for using secure resources in accordance with the present invention.

FIG. 7A depicts a method 400 for utilizing the secure resources in executing an application that may perform a secure transaction. At least a portion of the application is executed using the master security co-processor 210 or 260. In a preferred embodiment, it is determined whether sufficient secure resources are available for executing the application, via step 410. Note, however, that step 410 is optional. Also in a preferred embodiment, step 410 includes querying the database of secure resources to determine whether the secure peripherals 204 and 212 or 254 and 262 required to execute the application are available. In a preferred embodiment, if sufficient resources are not present, then the application is not executed. However, in an alternate embodiment the risk of security breaches in executing the application without sufficient resources could be determined and the application executed if the risk is less than a particular tolerance.

If sufficient secured resources are present, then via step 420 secure channels are established between the master security co-processor 210 or 260 and the secure resources, such as the secure peripherals 204, 212, 254, or 262, which may be used by the application. In a preferred embodiment, step 420 is performed by a content protection application residing on the master security co-processor 210 or 260. The content protection application is accessed by the application that may use the secure resources. The content protection application then performs step 420. The secure channels are then used for communication between the master security co-processor 210 or 260 and the secure peripherals 204 and 212 or 254 and 262, respectively, when executing the application, via step 430.

Figure 7B:
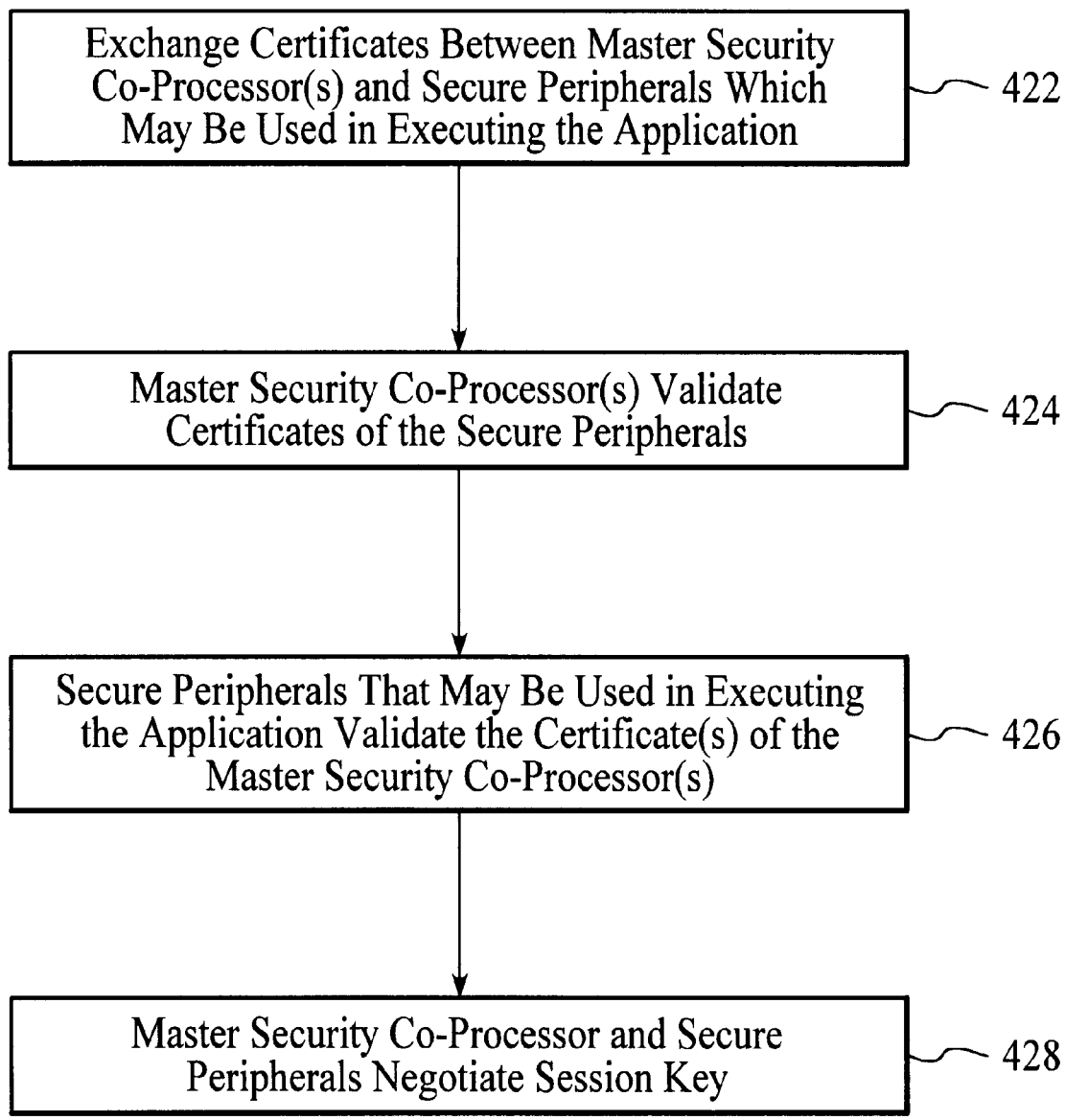
FIG. 7B is a flow chart of a method for providing a secure channel in accordance with the present invention.

FIG. 7B depicts a more detailed flow chart of a preferred embodiment of the step 420 of establishing secure channels. The master security co-processor 210 or 260 exchanges digital certificates with each of the secure peripherals 204 and 212 or 254 and 262, respectively, or other secure resources which may be used, via step 422. The master security co-processor 210 or 260 then validates the digital certificate of each of the secure peripherals 204 and 212 or 254 and 262, respectively, or other secure resources, via step 424. Each of the secure peripherals 204 and 212 or 254 and 262 or other secure resources which may be used validates the digital certificate of the master security co-processor 210 or 260, respectively, via step 426. The master security co-processor 210 or 260 then provides a session key, via step 428. In a preferred embodiment, the master security co-processor 210 or 260 and the secure peripheral 204 and 212 or 254 and 262 negotiate the session key by using a key exchange algorithm for each secure peripheral 204 and 212 or 254 and 262, respectively, that may be used with the application. Each key negotiation operation yields a unique session key for use in secure communications with the master security co-processor and the respective secure peripheral. Session keys are negotiated using common key exchange algorithms such as Diffie-Hellman.

Once the session key is negotiated in step 428, then via step 430, depicted in FIG. 7A, the session key is used to exchange data between the master security co-processor 210 or 260 and the secure peripherals 204 and 212 or 254 and 262 being used to execute the application. Using the session key, data is encrypted for transmission via the secure channel between the master security co-processor 210 or 260 and each of the secure peripherals 204 and 212 or 254 and 262, respectively. The data is then decrypted by the master security co-processor 210 or 260 and each of the secure peripherals 204 and 212 or 254 and 262, respectively, receiving the encrypted data. Thus, data exchanged between the master security co-processor 210 or 260 and the secure peripherals 204 and 212 or 254 and 262 is immune to snooping. This is because only the endpoints of the secure channels can decrypt the information passing between the master security co-processor 210 or 260 and the secure peripherals 204 and 212 or 254 and 262, respectively. In a preferred embodiment, once the application has finished executing, the secure channels provided using the method 420 are preferably destroyed. In a preferred embodiment, this includes destroying the session key negotiated in step 430.

Thus, the present invention has a variety of benefits. The integrity of the secure resources in each system 200 and 250 can be explicitly verified using the BIOS 208 or 258, respectively. Once secure channels are established between the master security co-processor 210 or 260 and the secure peripherals 204 and 212 or 254 and 262, respectively, sensitive and other data used in executing an application allowing for secured transactions can be transferred between the master security co-processor 210 or 260 and the secure peripherals 204 and 212 or 254 and 262, respectively, without making the data vulnerable to attack. Moreover, sensitive data that is input through a secure peripheral 204, 212, 254, or 262, such as a secure keyboard, may be transferred to other secure resources and used in executing an application. Thus, the integrity of sensitive data input to the system 200 or 250 is not compromised even though the application is being executed by the system 200 or 250. Moreover, the execution of the application is accomplished using a master security co-processor 210 or 260 which may have a high bandwidth. Therefore, speed of processing is increased over an embodiment of an external security processor.

Each secure peripheral 204, 212, 254, and 262 and each master security co-processor 210 and 260 are given unique digital certificates and private keys, known as credentials. It is possible to track the use of these secure resources using the corresponding credential. For example, the system administrator 202 can track the use of the secure peripheral 204 or 212 by monitoring the credentials of the secure peripheral 204 or 212, respectively. Moreover, using the method 400 it is possible to make a determination of the secure resources available and make run-time decisions as to the risks involved in execution.

Figure 8:
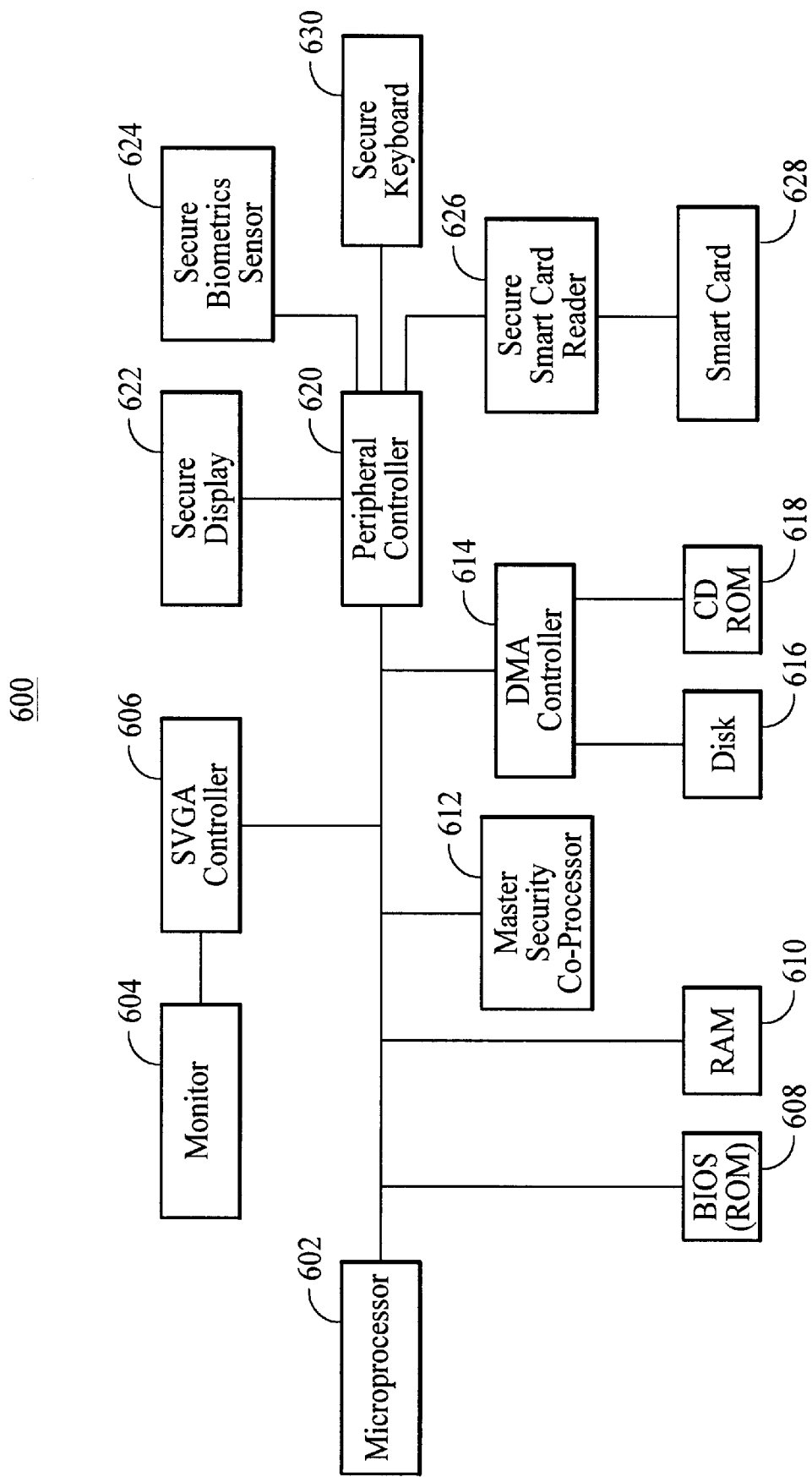
FIG. 8 is a diagram of one embodiment of a system in accordance with the present invention used in performing a particular secured transaction.

To more clearly demonstrate the benefits of the method and system in accordance with the present invention, refer to FIG. 8. FIG. 8 depicts a particular embodiment of a system 600 in accordance with the present invention which is used in a particular secured transaction. The secured transaction allows a user to receive video content from a server (not shown). The system 600 includes a conventional microprocessor 602, a random access memory (RAM) 610, a direct memory access (DMA) controller 614 coupled to a disk 616 and a CD-ROM 618. The disk 616 or CD-ROM 618 holds data which a user may wish to access.

The RAM 610 is used as a mailbox for messages between one secure resource and another. For example, communication between a secure keyboard 630 and a master security co-processor 612 would be performed by the secure unit device drivers. A message from the co-processor 612 to keyboard 630 would be written to the RAM 610 via the security co-processor 630 with a header indicating that it was destined for the secure keyboard 630. Then the message would be passed to the secure keyboard driver for transmission to the keyboard 630. The keyboard 630, in responding, would mark a message as intended for the security co-processor 612, and the receiving driver would perform a similar function by putting the message into the mailbox (input queue) of the security coprocessor 612. As these message payloads were encrypted with a session key, the "secure channel" concept would provide for data confidentiality between the devices.

The system 600 also includes a monitor 604, an SVGA controller 606 coupled to the monitor, and a peripheral controller. The peripheral controller is coupled to a secure display 622, a secure biometrics sensor 624, a secure keyboard 630, and a secure smart card reader 626 that can be coupled to a smart card 628. The secure display 622, the secure biometrics sensor 624, the secure smart card reader 626, and the secure keyboard 630 are secure peripherals having a security co-processor and host interface, such as the security co-processor 122 and the host interface 134. The system 600 also includes a read only memory (ROM) containing a BIOS 608 in accordance with the present invention, and a master security co-processor 612 in accordance with the present invention. The BIOS 608 verifies the integrity of the master security co-processor 612, the secure display 622, the secure biometrics sensor 624, the secure smart card reader 626, and the secure keyboard 630 using the method 340, depicted in FIG. 6B.

Figure 9A:
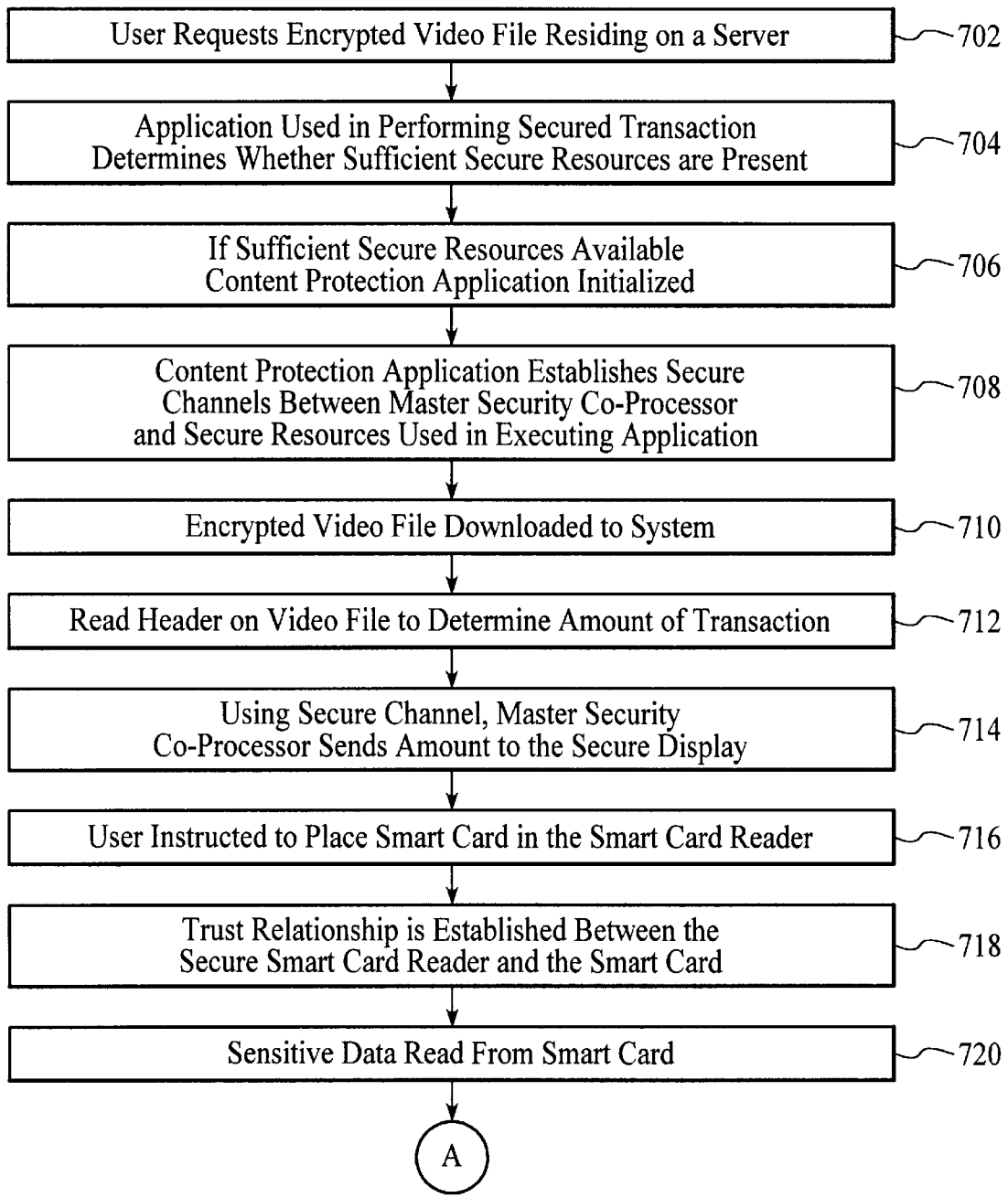
FIG. 9A is a flow chart of a portion of a method for providing a secure transaction to deliver video in accordance with the present invention.
Figure 9B:
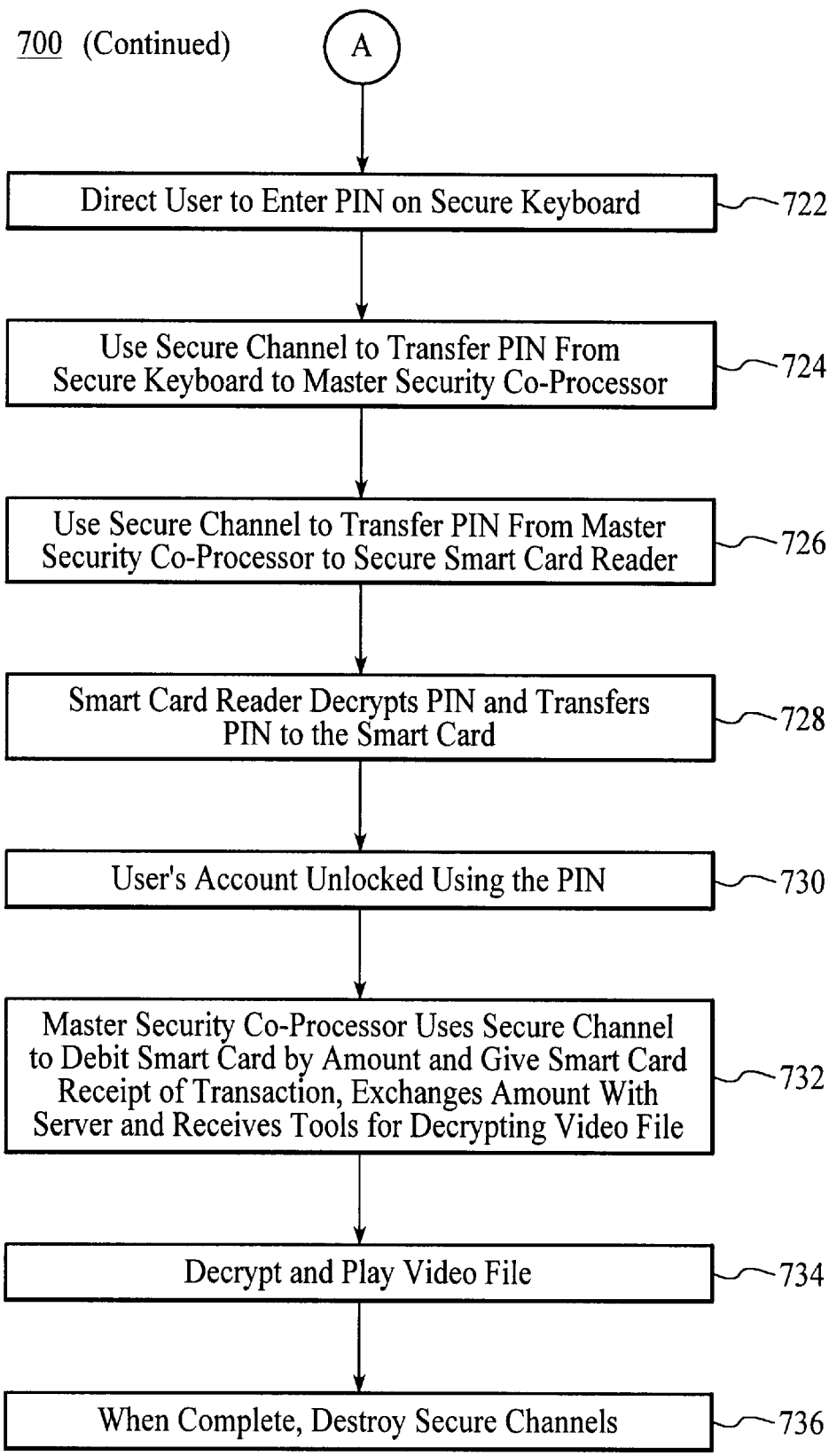
FIG. 9B is a flow chart of a portion of a method for providing a secure transaction to deliver video in accordance with the present invention.

FIGS. 9A and 9B are flow charts which together depict a method 700 for providing a secure transaction to deliver video to the system 600. Refer to FIGS. 8, 9A and 9B to describe the method 700. The user requests an encrypted video file residing on a server (not shown in FIG. 8), via step 702. In order to decrypt the video file, the user will have to provide value to the provider of the video. Thus, a secured transaction which transfers sensitive information is required in order for the user to obtain and view the desired video. The application residing on the system 600 that will be used in performing the secured transaction queries the database of secure resources to determine if sufficient resources are present, via step 704. The database was provided when the BIOS 608 validated the components of the system using the method 340. Thus, step 704 is analogous to the step 410 of the method 400 depicted in FIG. 7A. Referring back to FIGS. 8, 9A and 9B, if sufficient resources are available, the application initializes the content protection application (not shown) in the master security co-processor 612, via step 706. The content protection application in the master security co-processor 612 then establishes secure channels between the master security co-processor 612 and the requisite secure resources such as the secure display 622, the secure biometrics sensor 624, the secure smart card reader 626, and the secure keyboard 630, via step 708. Step 708 is analogous to the step 420 depicted in FIGS. 7A and 7B.

Referring back to FIGS. 8, 9A, and 9B, the encrypted video file is then downloaded to the system 600, via step 710. The encrypted video file preferably includes a plaintext header with abstract and usage information. Via step 712, the system 600 reads the header to determine the amount to be transferred to the provider of the video file in order for the system to be able to decrypt the video file. Using the secure channel between the master security co-processor 612 and the secure display 622, the master security co-processor 612 transfers the amount to the secure display 622, via step 714. The amount of the transaction need not be encrypted. However, the amount should be authenticated to ensure that the correct amount is transferred from the user to the provider of the video file.

Once the amount is authenticated, the secure display 622 displays the amount to the user and instructs the user to place the smart card 628 in the smart card reader 626, via step 716. A trust relationship is established between the secure smart card reader 626 and the smart card 628, via step 718. In a preferred embodiment, step 718 includes validating the digital certificate of the smart card 628. The secure smart card reader 626 then reads sensitive data from the smart card 628, via step 720. In a preferred embodiment, step 720 includes reading a value in the user's account with the provider of the video file and determining that a personal identification number (PIN) must be used to unlock the user's account. The secure display 622 is utilized to direct the user to enter the PIN on the secure keyboard 630, via step 722.

The secure channel between the master security co-processor 612 and the secure keyboard 630 is then used to transfer the PIN from the secure keyboard 630 to the master security co-processor 612, via step 724. Thus, step 724 includes encrypting the PIN using the session key for the secure channel between the master security co-processor 612 and the secure keyboard 630. The secure channel between the master security co-processor 612 and the secure smart card reader 626 is then used to transfer the PIN to the secure smart card reader 626, via step 726. Thus, the PIN is also encrypted for transfer in step 726. The secure smart card reader 626 then decrypts and transfers the PIN to the smart card 628, via step 728. The smart card uses the PIN to unlock the user's account, via step 730.

Once the user's account is unlocked, the master security co-processor 612 uses the secure channel between the secure smart card reader 626 and the master security co-processor 612 to debit the user's account by the amount of the transaction and give receipt of the transaction to the smart card 628, via step 732. Also in step 732 the master security co-processor 612 exchanges the amount with the server, and receives the necessary tools, such as the key, for decrypting the video file. The video file is then decrypted and played, via step 734. When completed, the secure channels provided for executing the application are destroyed, via step 736.

Because the master security co-processor 612 has a large bandwidth and direct access to the resources of the system 600, the video file can be decrypted and played real time in step 734. Thus, the system 600 can engage in a secured transaction. In addition, the master security co-processor can adequately play the video file to the user. Playing the video file real time may not be possible using only a security co-processor, such as the security processor 122, residing in the secure smart card reader 626, or only the smart card 628, because of limited bandwidth to the security coprocessor.

A method and system has been disclosed for using and authenticating secured resources to execute a secured transaction. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for executing secure transactions on a computer system, the method comprising the steps of:
    (a) providing a basic input output system (BIOS) on the computer system, the BIOS including first means for indicating a first trust relationship with the BIOS;
    (b) providing a secure peripheral coupled with the computer system, the secure peripheral including second means for indicating a second trust relationship with the secure peripheral;
    (c) providing a master security co-processor coupled with the secure peripheral and the memory, the master security co-processor for processing sensitive data on the computer system and including third means for indicating a third trust relationship with the master security co-processor; and
    (d) utilizing the BIOS or master security co-processor to verify at least one of the first trust relationship, the second trust relationship, or the third trust relationship using the first means for indicating the first trust relationship, the second means for indicating the second trust relationship, or the third means for indicating the third trust relationship.

2. The method of claim 1 wherein the BIOS further includes a signature mechanism utilizing step (d) further includes the step of:
    (d1) verifying the first trust relationship using the signature mechanism.

3. The method of claim 1 further comprising the step of:
    (e) utilizing the BIOS to verify the second trust relationship using the second means for indicating the second trust relationship and to verify the third trust relationship using the third means for indicating the third trust relationship.

4. The method of claim 3 wherein the secure peripheral includes a second digital certificate and a second private key, the master security co-processor includes a third digital certificate and a third private key; and wherein the BIOS utilizing step (e) further includes the steps of:
    (e1) verifying the second digital certificate and the third digital certificate.

5. The method of claim 3 further comprising the step of:
    (f) providing a list of a plurality of secure resources, the plurality of secure resources including the master security co-processor and the secure peripheral.

6. The method of claim 4 wherein the computer system further includes an application, a portion of the application to be executed by the master security co-processor, and wherein the method further includes the step of:

(g) establishing a secure channel for communication between the master security co-processor and the secure peripheral.

7. The method of claim 6 wherein the master security co-processor further includes a first digital certificate, wherein the secure peripheral includes a second digital certificate, and wherein secure channel establishing step (g) further includes the step of:

(g1) providing the first digital certificate to the secure peripheral;

(g2) providing the second digital certificate to the master security co-processor;

(g3) verifying the first digital certificate using the secure peripheral;

(g4) verifying the second digital certificate using the master security co-processor; and (g5) providing a session key for communication between the master security co-processor and the secure peripheral for executing the portion of the application.

8. The method of claim 6 further comprising the step of:

(h) executing the portion of the application by the master security co-processor utilizing the secure channel.

9. The method of claim 8 further comprising the step of:

(i) determining whether the application can be executed securely.

10. The method of claim 9 where in the system includes a plurality of resources and wherein determining step (i) further includes the steps of:

(i1) determining whether the plurality of resources are sufficient for executing the application; and (i2) executing the application only if the plurality of resources is sufficient.

11. The method of claim 10 wherein resource determining step (i1) further includes the step of:

(i1a) determining if the secure peripheral is sufficient for executing the application.

12. The method of claim 9 further comprising the step of:

(j) allowing a system administrator to track use of the secure peripherals.

13. A method for executing an application utilizing sensitive data on a computer system, the computer system including a master security co-processor and a secure peripheral, the master security co-processor including a first digital certificate and a first key, the secure peripheral including a second digital certificate and a second key, the method comprising the steps of:

(a) establishing a secure channel for communication between the master security co-processor and the secure peripheral for executing a portion of the application, the secure channel establishing step (a) further including the steps of (a1) providing the first digital certificate to the secure peripheral;

(a2) providing the second digital certificate to the master security co-processor;

(a3) verifying the first digital certificate using the secure peripheral;

(a4) verifying the second digital certificate using the master security co-processor; and (a5) providing a session key based on the first key and the second key, the session key for communication between the master security co-processor and the secure peripheral for executing the portion of the application; and (b) executing the portion of the application by the master security co-processor utilizing the secure channel.

14. The method of claim 13 further comprising the step of:

(c) determining whether the application can be executed securely.

15. The method of claim 14 wherein the system includes a plurality of resources and wherein determining step (c) further includes the steps of:

(c1) determining whether the plurality of resources are sufficient for executing the application; and (c2) executing the application only if the plurality of resources is sufficient.

16. The method of claim 15 wherein resource determining step (c1) further includes the step of:

(c1i) determining if the secure peripheral is sufficient for executing the application.

17. A method for executing an application utilizing sensitive data on a computer system, the computer system including a master security co-processor and a secure peripheral, the method comprising the steps of:

(a) establishing a secure channel for communication between the master security co-processor and the secure peripheral for executing a portion of the application;

(b) executing the portion of the application by the master security co-processor utilizing the secure channel;

(c) determining whether the application can be executed securely; and (d) allowing a system administrator to track use of the secure peripheral.

18. An apparatus for executing secure transactions on a computer system comprising:

a computer system including a basic input output system (BIOS), the BIOS including first means for indicating a first trust relationship with the BIOS;

a secure peripheral coupled with the computer system, the secure peripheral including second means for indicating a second trust relationship with the secure peripheral; and a master security co-processor coupled with the computer system, the master security co-processor including third means for indicating a third trust relationship with the security co-processor;

wherein the BIOS verifies at least one of the first trust relationship, the second trust relationship, or the third trust relationship using the first means for indicating the first trust relationship, the second means for indicating the second trust relationship, or the third means for indicating the third trust relationship.

19. The apparatus of claim 18 wherein the BIOS further includes a signature mechanism and wherein the BIOS further verifies the first trust relationship using the signature mechanism.

20. The apparatus of claim 18 wherein the BIOS further verifies the second trust relationship using the second means for indicating the second trust relationship and verifies the third trust relationship using the third means for indicating the third trust relationship.

21. The apparatus of claim 20 wherein the secure peripheral includes a second digital certificate and a second private key, the master security co-processor includes a third digital certificate and a third private key; and wherein the BIOS further verifies the second digital certificate and the third digital certificate.

22. The apparatus of claim 21 wherein the computer system further includes an application, a portion of the application to be executed by the master security co-processor, and wherein the apparatus further includes:

means for establishing a secure channel for communication between the master security co-processor and the secure peripheral when executing the portion of the application.

23. The apparatus of claim 22 wherein the master security co-processor further includes a first digital certificate, wherein the secure peripheral includes a second digital certificate, and wherein secure channel establishing means further includes:

means for providing the first digital certificate to the secure peripheral;

means for providing the second digital certificate to the master security co-processor;

means for verifying the first digital certificate using the secure peripheral;

means for verifying the second digital certificate using the master security co-processor; and means for negotiating a session key for communication between the master security co-processor and the secure peripheral for executing the portion of the application.

24. The apparatus of claim 23 wherein the mater security co-processor executes the portion of the application utilizing the secure channel.

25. The apparatus of claim 22 further comprising:

means for determining whether the application can be executed securely.

26. The apparatus of claim 25 wherein the system includes a plurality of resources and wherein means for determining whether the application can be executed securely further includes:

means for determining whether the plurality of resources are sufficient for executing the application; and means for executing the application only if the plurality of resources is sufficient.

27. The apparatus of claim 26 wherein means for determining whether the plurality of resource is sufficient further includes:

means for determining if the secure peripheral is sufficient for executing the application.

28. The apparatus of claim 25 wherein the system is managed by a system administrator and wherein the system administrator is allowed to track use of the secure peripheral.

29. The apparatus of claim 20 wherein the BIOS further provides a list of a plurality of secure resources, the plurality of secure resources including the master security co-processor and the secure peripheral.

30. An apparatus for executing an application utilizing sensitive data on a computer system, the computer system including a master security co-processor and a secure peripheral, the master security co-processor further including a first digital certificate, the secure peripheral including a second digital certificate, the apparatus comprising:

means for establishing a secure channel for communication between the master security co-processor and the secure peripheral for executing a portion of the application, the secure channel establishing means further including means for providing the first digital certificate to the secure peripheral;

means for providing the second digital certificate to the master security co-processor;

means for verifying the first digital certificate using the secure peripheral;

means for verifying the second digital certificate using the master security co-processor; and means for providing a session key for communication between the master security co-processor and the secure peripheral for executing the application; and means for executing the portion of the application by the master security co-processor utilizing the secure channel.

31. The apparatus of claim 30 further comprising:

means for determining whether the application can be executed securely.

32. The apparatus of claim 31 wherein the system includes a plurality of resources and wherein the means for determining whether the application can be executed securely further includes:

means for determining whether the plurality of resources are sufficient for executing the application; and means for executing the application only if the plurality of resources is sufficient.

33. The apparatus of claim 32 wherein the resource determining means further includes:

means for determining if the secure peripheral is sufficient for executing the application.

34. An apparatus for executing an application utilizing sensitive data on a computer system, the computer system including a master security co-processor and a secure peripheral, the apparatus comprising:

means for establishing a secure channel for communication between the master security co-processor and the secure peripheral for executing a portion of the application; and means for executing the portion of the application by the master security co-processor utilizing the secure channel means for determining whether the application can be executed securely means for allowing a system administrator to track use of the secure peripheral.

* * * * *